US008755563B2

(12) United States Patent
Cao et al.

(10) Patent No.: US 8,755,563 B2
(45) Date of Patent: Jun. 17, 2014

(54) TARGET DETECTING METHOD AND APPARATUS

(75) Inventors: Qiong Cao, Beijing (CN); Rujie Liu, Beijing (CN); Hao Yu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 13/204,162

(22) Filed: Aug. 5, 2011

(65) Prior Publication Data

US 2012/0039508 A1    Feb. 16, 2012

(30) Foreign Application Priority Data

Aug. 10, 2010    (CN) .......................... 2010 1 0252378

(51) Int. Cl.
*G06K 9/46*    (2006.01)
*G06T 5/30*    (2006.01)

(52) U.S. Cl.
USPC ........... 382/103; 382/104; 382/199; 382/202; 382/257

(58) Field of Classification Search
None
See application file for complete search history.

(56) References Cited

U.S. PATENT DOCUMENTS

| 6,625,300 | B1* | 9/2003 | Kyo ............................... 382/104 |
| 2008/0285799 | A1* | 11/2008 | Chiu et al. ..................... 382/103 |
| 2009/0028385 | A1* | 1/2009 | Cavallaro et al. ............. 382/103 |

FOREIGN PATENT DOCUMENTS

| CN | 101673345 A | 3/2010 |
| CN | 101739551 A | 6/2010 |

OTHER PUBLICATIONS

Navneet Dalal et al. "Histograms of Oriented Gradients for Human Detection", IEEE Conference on Computer Vision and Pattern Recognition, vol. 1, pp. 1-8, 2005.
Chinese Office Action issued Mar. 4, 2013 in corresponding Chinese Application No. 20100252378.2
Chinese Office Action mailed Nov. 21, 2013 in corresponding Chinese Patent Application No. 201010252378.2.

* cited by examiner

*Primary Examiner* — Jon Chang
(74) *Attorney, Agent, or Firm* — Staas & Halsey LLP

(57) ABSTRACT

Target detecting method and apparatus are disclosed. In the target detecting method, edges in a first direction in an input image may be detected to obtain an edge image comprising a plurality of edges in the first direction; and one or more candidate targets may be generated according to the plurality of edges in the first direction, a region between any two of the plurality of edges in the first direction in the input image corresponding to one of the candidate targets.

16 Claims, 7 Drawing Sheets

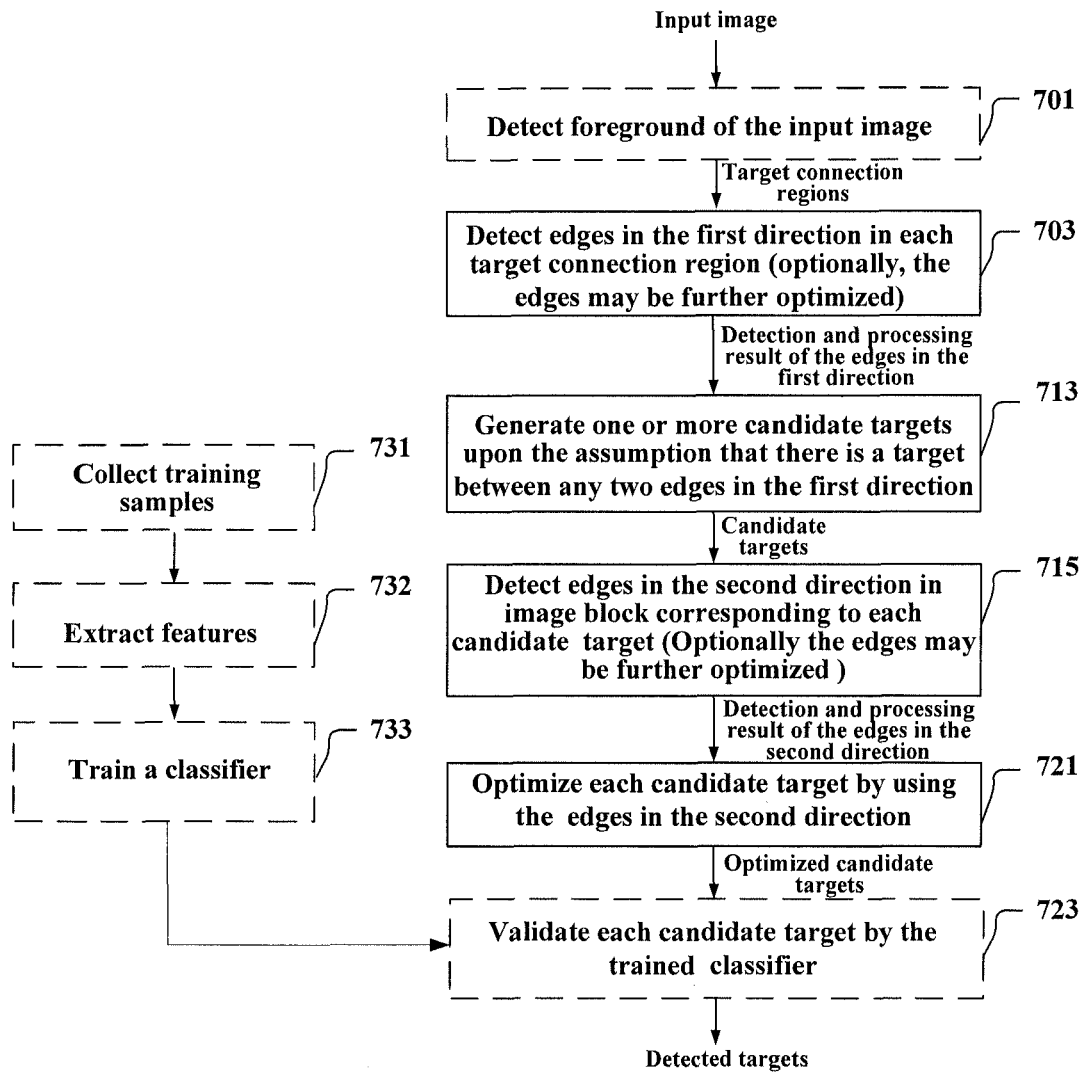
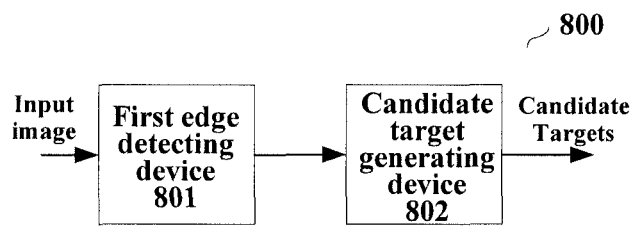
Figure 7
Figure 8

TARGET DETECTING METHOD AND APPARATUS

CROSS-REFERENCE TO RELATED APPLICATIONS

This application claims the benefit of Chinese Application No. 201010252378.2, filed Aug. 10, 2010, the disclosure of which is incorporated herein by reference.

TECHNICAL FIELD

The present disclosure relates to the field of target detection, and more particularly, to a method and apparatus for detecting a target in an image or video.

BACKGROUND

Target detection in images is widely used. For example, video-based vehicle detection may be applied in intelligence traffic management to monitor the traffic on roads, thereby discovering various potential troubles on the roads in time.

SUMMARY

Some embodiments of the present disclosure provide methods and apparatus for detecting a target in an image or video.

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to an embodiment the disclosure, when performing target detection, edges in a first direction in an input image may be detected to obtain an edge image including a plurality of edges in the first direction. Then, one or more candidate targets may be generated according to the plurality of edges in the first direction, wherein the region between any two of the plurality of edges in the first direction in the input image corresponds to one of the candidate targets.

BRIEF DESCRIPTION OF THE DRAWINGS

The above and other objects, features and advantages of the embodiments of the disclosure can be better understood with reference to the description given below in conjunction with the accompanying drawings, throughout which identical or like components are denoted by identical or like reference signs. It should be noted that the components shown in the drawings are illustrated in a simplified manner, rather than being plotted in proportion. In the drawings:

FIG. 7 is a schematic flow chart illustrating a target detecting method according to a particular embodiment of the disclosure;

FIG. 8 is a schematic block diagram illustrating a target detecting apparatus according to an embodiment of the disclosure;

DESCRIPTION OF EMBODIMENTS

Figure 1:
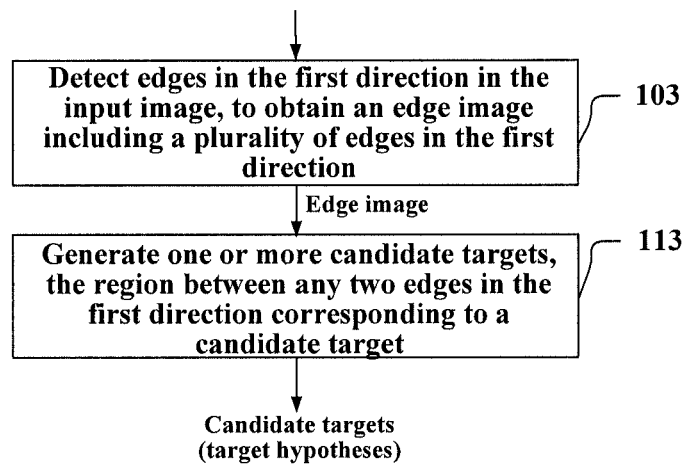
FIG. 1 is a schematic flow chart illustrating a target detecting method according to an embodiment of the disclosure.

The embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that only device structures and/or processing steps closely relevant to the solutions of the disclosure will be illustrated in the drawings while omitting other details less relevant to the disclosure or well known in the art for the sake of clarity and conciseness.

In the disclosure, the so called image may be one or a set of still images, or may be series of images, such as video. In some embodiments of the disclosure, a priori knowledge of the targets to be detected is used to generate target hypotheses. For example, if the targets to be detected are vehicles, target hypotheses may be generated by using a priori knowledge of the appearance characters (e.g. geometry characters such as symmetry, shadow, angles and corners, vertical and horizontal edges, and other information such as texture, locations or shapes of the vehicle lamps) of the vehicle.

FIG. 1 is a schematic flow chart illustrating a target detecting method according to an embodiment of the disclosure. In the embodiment as shown in FIG. 1, target hypothesis (also referred to as candidate target) is generated by using the edge features of a target in an image.

As shown in FIG. 1, the target detecting method of the embodiment may include steps 103 and 113.

In step 103, edges in a certain direction (For conciseness, the direction is referred to as the first direction and the edges along this direction are referred to as edges in the first direction), are detected to obtain an edge image including a plurality of edges in the first direction. The so-called first direction may be the vertical direction or the horizontal direction, or may be any other direction different from the vertical or horizontal direction. A direction may be selected as the first direction according to the edge features of the target in the image. For example, if the input image is a picture or video on road traffic, the vehicles shown in the image each include vertical and horizontal edges though they may be covered by each other in the image. In such cases, the vertical direction may be set as the first direction. Alternatively, the horizontal direction may be set as the first direction.

Any appropriate method may be used to detect the edges in the first direction in the image. For example, convolution operation may be performed by using a detection arithmetic operator for the edges in the first direction and the input image, to obtain the edge image including the edges in the first direction. As an example, the detection arithmetic operator for the edges in the first direction may be gradient operator, Sobel Operator, Prewitt Operator, or Laplacian Operator, or the like.

Then in step 113, based on the assumption that there is a target between any two edges in the first direction, one or more target hypotheses (or candidate targets) are generated according to the plurality of detected edges in the first direction. In the other words, the region between any two of the plurality of edges in the first direction in the input image corresponds to one of the candidate targets.

For example, in the case that the target to be detected is vehicle and the image includes a plurality of vehicles, the vehicles in the image may be covered by each other so that the symmetry of each vehicle and/or other features in the image may be damaged. Nevertheless, these vehicle targets, though being covered, may include some vertical or horizontal edges, and these edges may include the right or left boundaries (or the upper or lower boundaries) of the vehicles. In view of this, each candidate target thus generated may correspond to the region between the corresponding two edges in the first direction (e.g. two vertical edges or two horizontal edges). For example, the region may be represented by a rectangular block (In other examples, the region may be represented by other geometry shapes such as circular or the like). If the first direction is the vertical direction, the width of each target hypothesis (each candidate target) may be the distance between the two vertical edges corresponding to the candidate target, and its height may be determined according to the height (i.e. the horizontal positions in the image) of the vertical edges in the images. Of course, to determine the height of a candidate target, a priori knowledge of the size of the vehicle (which is associated with the resolution of the image, the shooting angle and distance of the image, and the size and aspect ratio of the target in the image) may be taken into consideration, which is not detailed herein. Taking the vertical direction as the first direction, a plurality of target hypotheses may be generated based on the edges in the first direction (i.e. the vertical direction in this example) in the edge image obtained in the step 103. Supposing the edge image includes k (k≥1) vertical edges and there may be a vehicle between any two of the vertical edges, $C_k^2$ combinations may be generated according to the permutation and combination principle:

$$C_k^2 = \frac{k!}{2 \times (k-2)!} \quad (1)$$

In the above equation, "!" represents factorial operation. The image block between any two vertical edges may be considered as a vehicle hypothesis. Consequently, $C_k^2$ possible vehicle hypotheses may be generated. As an example, the height of each vehicle hypothesis in the vertical direction may be determined by the horizontal positions of the corresponding vertical edges.

In the embodiment shown in FIG. 1, the target hypotheses (candidate targets) in the image is generated based on the assumption that there may be a target between any two of edges along a certain direction in the image. Since only the edges in one direction are utilized in the detection, the computation of the detection is relatively simple, thereby speeding the target detection in the image. Moreover, since the region between any two edges in the first direction is considered as corresponding to one candidate target, failure of detection may be reduced. Of course, there may be some error detections among the candidate targets thus detected, which may be filtered and/or optimized in the subsequent processing.

Figure 2:
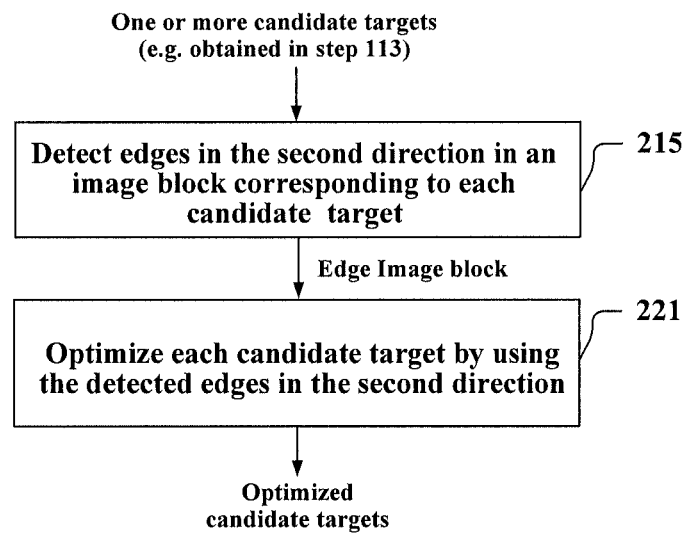
FIG. 2 is a schematic flow chart illustrating a target detecting method according to another embodiment of the disclosure.

FIG. 2 shows a target detecting method according to another embodiment. Similar to FIG. 1, the method shown in FIG. 2 utilizes the steps 103 and 113 to detect the edges in the first direction in the image and generate candidate targets. The difference lies in that, in the method as shown in FIG. 2 the edges along another direction (referred to as the second direction) are also utilized, to optimize each candidate generated in the previous steps.

As shown in FIG. 2, the target detecting method of the embodiment may further include steps 215 and 221.

Particularly, in step 215, the edges in the second direction in the image block corresponding to each candidate target in the input image are detected, to obtain an edge image block which includes one or more edges in the second direction. The second direction is a direction different from the first direction. For example, if the vertical direction is set as the first direction, the horizontal direction or any other direction different from the first direction may be set as the second direction according to a priori knowledge of the target edges in the image; and if the horizontal direction is set as the first direction, the vertical direction or any other direction may be set as the second direction. Any appropriate method may be used to detect the edges in the second direction in the image. For example, convolution operation may be performed by using a detection arithmetic operator of the edges in the second direction and the input image, to obtain the edge image including the edges in the second direction. As examples, the detection arithmetic operator for the edges in the second direction may be gradient operator, Sobel Operator, Prewitt Operator, or Laplacian Operator, or the like.

Then in step 221, each candidate target is optimized according to the plurality of detected edges in the second direction that correspond to the each candidate target. For example, in the case that the vertical direction is set as the first direction and the target to be detected is vehicle and the input image is an image taken from behind the vehicles or in front of the vehicles, the front or rear parts of the vehicles in the image includes abundant structural information of horizontal (the second direction) gradient. Each vehicle has smooth front windshield window or rear window on its upper part, and underneath each vehicle is the surface of the road. The areas between these parts each include abundant horizontal edges. According to a priori knowledge of the vehicle targets, the position information of the horizontal edges may be used to optimize the candidate targets generated based on vertical edges. For example, the heights of the candidate targets in the first direction (i.e. the vertical heights of the candidate targets) may be optimized.

Figure 3:
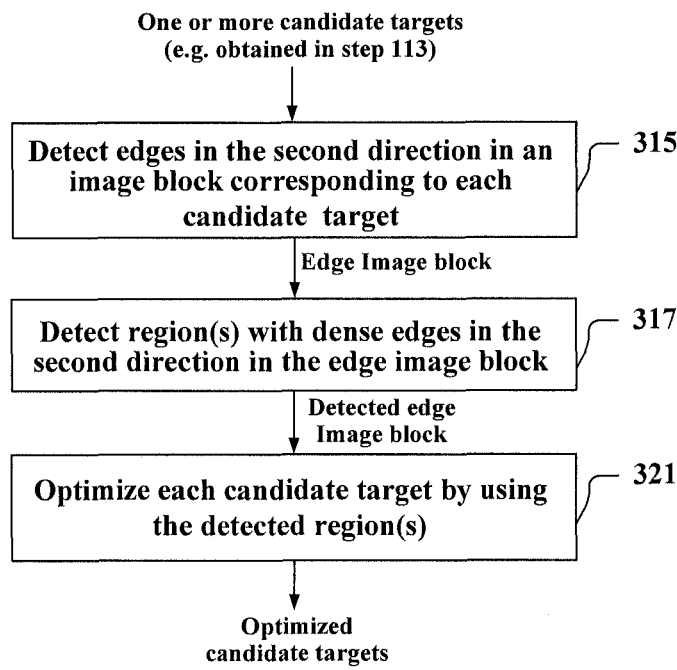
FIG. 3 is a schematic flow chart illustrating a target detecting method according to another embodiment of the disclosure.

FIG. 3 shows a target detecting method according to another embodiment. In the embodiment as shown in FIG. 3, the edges in the second direction in the image are also used to optimize each candidate target generated based on the edges in the first direction, which is similar to the embodiment described with reference to FIG. 2. Particularly, after detecting the edges in the first direction in the image and generating one or more candidate targets by using the steps 103 and 113 as shown in FIG. 1, the target detecting method as shown in FIG. 3 further includes steps 315, 317, and 321.

In step 315, the edges in the second direction in an image block corresponding to each candidate target in the input image are detected, thus obtaining an edge image block including a plurality of edges in the second direction. The edge image block corresponds to the each candidate target. The steps 315 and 321 are similar to the steps 215 and 221 shown in FIG. 2, and are not be detailed herein.

In step 317, the edge image block corresponding to each candidate target obtained in the step 315 is further processed, i.e., the region(s) with dense edges in the second direction is detected in the edge image block. A filter which has relatively strong response to the region with dense edges in the second direction and has relatively weak response to the other regions may be used to filter the edge image block, so as to obtain the region(s) with dense edges in the second direction.

As an example, an adaptive filter designed with mixed Gaussian function may be used to filter the edge image block. The mixed Gaussian function may be represented by $f(y)$ in the following formula:

$$f(y) = \sum_{i=1}^{k} w_i \times g(y; \mu_i, \delta_i) \qquad (2)$$

In the above formula, $g(y; \mu_i, \delta_i)$ represents a Gaussian function with mean value $\mu_i$ and variance $\delta_i$, k represents the number of Gaussian functions, and $w_i$ represents the linear coefficients of the Gaussian functions. These parameters may be appropriately selected or adjusted, so that the filter has relatively strong response to the region with dense edges in the second direction and has relatively weak response to other regions, the description of which is omitted herein.

For example, in the case that the vertical direction is set as the first direction and the target to be detected is vehicle and the input image is an image taken from behind the vehicles or in front of the vehicles, the regions with dense horizontal edges in the image may include the front or rear parts of the vehicle targets, such as the regions between the front windshield windows or rear windows and the road surface underneath the vehicles. The filter used for filtering the image has strong response to these regions in the image, while having relatively weak response to the other regions. For example, the resultant image region obtained by filtering the regions without dense horizontal edges may exhibit a disorder state. By using the detected regions with dense horizontal edges and a priori knowledge of the vehicle targets, the upper and lower boundaries of a vehicle target may be determined effectively, thereby optimizing the candidate targets generated based on the vertical edges, e.g. optimizing the height in the first direction of each candidate target (i.e. the height in the vertical direction).

Figure 4:
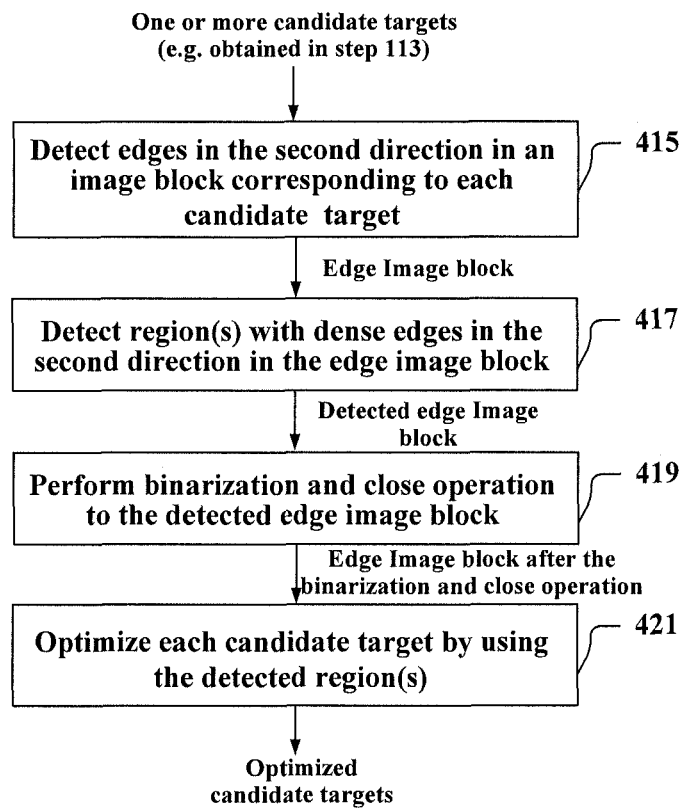
FIG. 4 is a schematic flow chart illustrating a target detecting method according to another embodiment of the disclosure.

FIG. 4 shows a target detecting method according to another embodiment. In the embodiment as shown in FIG. 4, the edges in the second direction in the image are also used to optimize each candidate target generated based on the edges in the first direction, which is similar to the embodiment described with reference to FIG. 3. Particularly, after detecting the edges in the first direction in the image and generating one or more candidate targets by using the steps 103 and 113 as shown in FIG. 1, the target detecting method as shown in FIG. 4 further includes steps 415, 417, 419 and 421.

Steps 415 and 417 are similar to steps 315, and 317 shown in FIG. 3, respectively, the description of which is not repeated herein.

In step 419, after detecting the region(s) with dense edges in the second direction by filtering the edge image block which corresponds to each candidate target and includes a plurality of edges in the second direction, binarization and close operation may be performed to the detected image block(s).

As a particular example, the binarization operation may be performed using the following formula:

$$TB(i, j) = \begin{cases} 1 & \text{if } (B(i, j) \geq \text{th\_v}) \\ 0 & \text{otherwise} \end{cases} \qquad (3)$$

In the above formula, B represents the image before the binarization operation, B(i, j) represents the pixel value at the position (i, j) of the image B. TB represents the image obtained from the binarization operation, and TB(i, j) represents the pixel value at the position (i, j) of the image TB. i and j both are integer, and (i, j) represents a 2-D coordinate in the image. th_v represents the threshold value used in the binarization operation. If the value B(i, j) of the pixel (i, j) in the image B is greater than or equal to the threshold value, the value TB(i, j) of the pixel at the same position (i, j) in the image TB is set as 1; otherwise the value TB(i, j) is set as 0. The threshold value may be determined and/or adjusted according to the actual application scenario, and is not defined to any particular value herein.

As a particular example, the close operation may be performed using the following formula:

$$OB = TB \cdot SE \qquad (4)$$

In the above formula, OB represents the image obtained by performing the close operation to the image TB, SE represents a structural arithmetic operator (or referred to as Structure Element, SE) of the close operation. The structural operator SE may be selected according to the actual application scenario. For example, the structural operator SE may be determined based on the size of the second-direction edge of the target in the image and/or the size of the detected region(s) with dense edges in the second direction and should not be limited to any particular value.

Then in step 421, each candidate target is optimized according to the plurality of detected edges in the second direction that correspond to the candidate target. For example, the heights of the candidate targets in the first direction may be optimized. This step 421 is similar to the step 321 shown in FIG. 3, the description of which is not repeated herein.

By using the above binarization and close operation, the region(s) with dense edges in the second direction in the image may be enhanced, thereby improving the optimization of the candidate targets.

Figure 5:
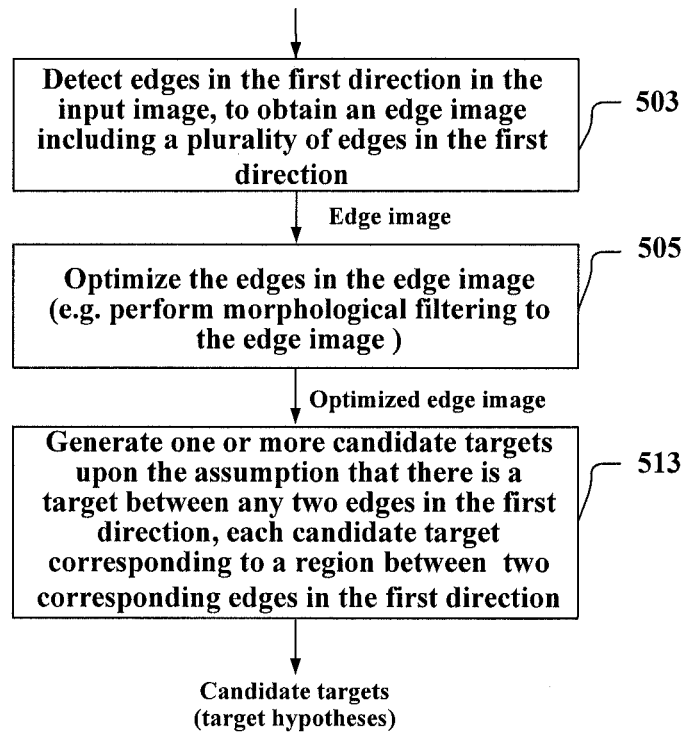
FIG. 5 is a schematic flow chart illustrating a target detecting method according to another embodiment of the disclosure.

FIG. 5 shows a target detecting method according to another embodiment. The method shown in FIG. 5 is similar to that of FIG. 1, and the difference lies in that, in the method as shown in FIG. 5, the detected edges in the first direction are optimized to remove noises, thereby improving the accuracy of the candidate targets to be generated in the subsequent steps.

As shown in FIG. 5, the target detecting method of the embodiment may include steps 503, 505 and 513.

In step 503, the edges in the first direction in an input image are detected, to obtain an edge image including a plurality of edges in the first direction. The step 503 is similar to the step 103 described above, the description of which is not repeated herein.

There may be much noises, such as lines that are too short and/or too tilted, in the edge image generated in step 503. In step 505, the edges in the first direction in the edge image obtained in step 503 may be optimized to remove the noises among the detected edges.

Figure 6:
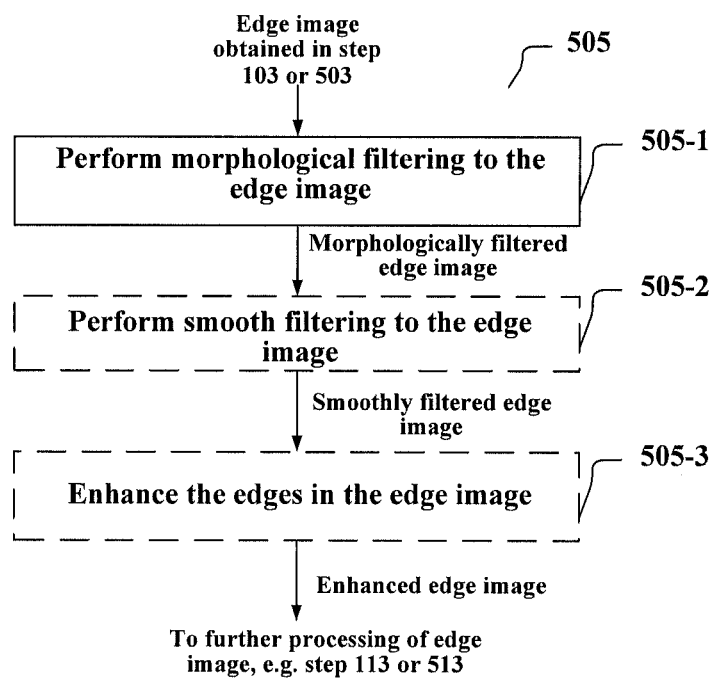
FIG. 6 is a schematic flow chart illustrating a method for performing edge optimization to the edge image including a plurality of edges in the first direction.

FIG. 6 illustrates an example of how to optimize the edges in the first direction in the edge image. As shown in FIG. 6, the optimizing step 505 may include step 505-1 in which a morphological filtering may be performed to the edge image by using a morphological filter. For example, in the step 505-1, a close and open filtering operation may be performed to the edge image by using a structure element in the first direction, to filter out the noise and output the edges in the first direction that can be used to differentiate the boundaries of the targets. More particularly, a gray level morphological close-open filtering may be performed to the gray level edge image. For example, a close operation may be performed first, and then an open operation may be performed to the edge image. Supposing the structure element in the first direction is represented by SE and the edge image including the edges in the first direction is represented by $E_i$, the close-open filtering performed to the edge image may be represented by the following formula:

$$ME_i = (E_i \cdot SE) \circ SE \quad (5)$$

In the above formula, the symbol "·" represents close operation, the symbol "∘" represents open operation, and $ME_i$ represents the image obtained by the morphological filtering. The structural operator SE may be determined based on the size of the targets to be detected in the image (e.g. the size of the edges in the first direction of the targets in the image), and should not be limited to any particular value.

By using the morphological filtering performed in step 505-1, small-sized noise may be removed from the image. For example, in the case that the vertical direction is set as the first direction and the horizontal direction is set as the second direction, the vertical edges (shown as vertical line segments) at the same horizontal coordinate may be connected with each other to obtain vertical edges with a relatively long length, while the small-sized noises are removed.

As another example, step 505 may further include the step 505-2 as shown in FIG. 6. In step 505-2, smooth filtering may be performed to the morphologically filtered edge image. Any appropriate smooth filtering method, such as median filtering or the like, may be employed. The smooth filtering facilitate to find the boundaries in the first direction of the candidate targets in the edge image, i.e. to find the positions with dense edges in the first direction or positions of edges in the first direction with high brightness, thus improving the accuracy of the generated candidate targets.

As another example, step 505 may further include the step 505-3 as shown in FIG. 6. In step 505-3, edge enhancement may be performed to the morphologically filtered edge image or smoothly filtered edge image. Any appropriate edge enhancement method such as binarization processing or the like may be used.

Following the processing in step 503, one or more candidate targets are generated based on a plurality of detected edges in the first direction in step 513, upon the assumption that there is a target between any two edges in the first direction. The region between any two of the detected edges in the first direction in the image corresponds to a candidate target. In other words, each candidate target corresponds to the region between two corresponding edges in the first direction in the image. The step 503 is similar to the above described step 113 and the detailed description of it is omitted herein. The optimization of the edges in the first direction in step 505 may reduce error alarms among the candidate targets thus generated.

FIG. 7 shows a target detecting method according to a particular embodiment of the disclosure.

As shown in FIG. 7, the target detecting method of the particular embodiment may include a foreground detecting step 701, in which the foreground of the input image is detected to obtain one or more target connection regions. After this step, the areas corresponding to the target connection regions in the input image are further processed by the following edge detecting and candidate target generating steps.

Figure 14:
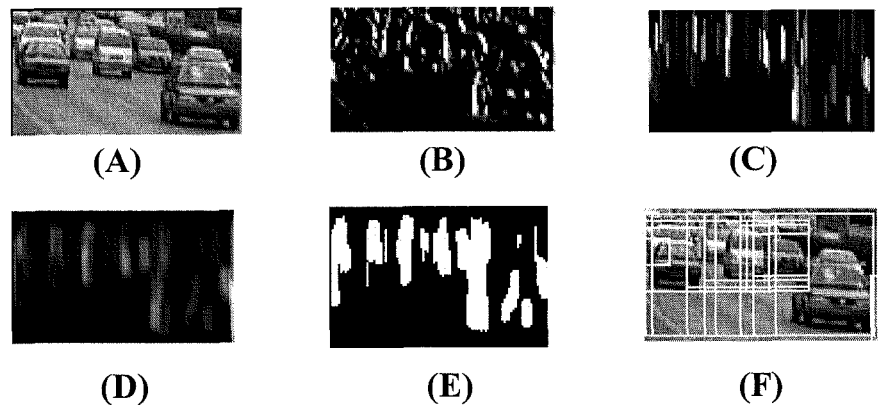
FIG. 14(A)-(F) are diagrams illustrating images processed by a target detecting method according to a particular embodiment of the disclosure.

As an example, supposing the target to be detected is vehicle, the vertical direction is set as the first direction an the horizontal direction is set as the second direction, firstly a foreground detection is performed to the input image containing vehicles, then the position of each detected target connection region is mapped into the input image. FIG. 14(A) illustrates a gray level image corresponding to a detected target connection region in an input image containing vehicles.

Then in step 703, the areas corresponding to one or more target connection regions in the input image are processed to detect the edges in the first direction (e.g. vertical edges) therein, thus obtaining an edge image including a plurality of vertical edges. In this example, Sobel operator is used to detect the vertical edges. FIG. 14(B) shows an edge image obtained by processing the image in FIG. 14(A) with the Sobel operator.

Optionally, the edge image including the edges in the first direction may be optimized. For example, the edge image may be morphologically filtered. Particularly, a vertical line with a length of 10 may be used as a morphological structure element SE:

$$SE = \underbrace{[1, 1, \ldots, 1]^T}_{10} \quad (6)$$

The above structure element may be utilized to perform close operation, and then open operation, to the gray level edge image shown in FIG. 14(B). Consequently, the image as shown in FIG. 14(C) is obtained. It is to be understood that the structure element with length 10 described above is merely an example. The structure element used in the embodiments or examples of the disclosure is not limited to this particular example.

Optionally, the image may be further processed by a smooth filtering with the following mask "mask":

$$mask = \begin{bmatrix} 0.25 & 0.25 & 0.25 & 0.25 & 0.25 \\ 0.25 & 0.25 & 0.25 & 0.25 & 0.25 \\ 0.25 & 0.25 & 0.25 & 0.25 & 0.25 \\ 0.25 & 0.25 & 0.25 & 0.25 & 0.25 \\ 0.25 & 0.25 & 0.25 & 0.25 & 0.25 \end{bmatrix} \quad (7)$$

FIG. 14(D) shows the image obtained by smoothly filtering the edge image in FIG. 14(C) by using the mask of the formula (7).

Optionally, an edge enhancement may be further performed to the image. For example, a binarization operation may be performed to the image as shown in FIG. 14(D). In this example, the gray level threshold used in the binarization operation is set as 35. FIG. 14(E) shows a binary edge image obtained by performing the binarization operation to the image of FIG. 14(D).

Then in step 713, one or more candidate targets are generated based on the assumption that there is a target between any two edges in the first direction. For example, according to the vertical edges in the edge image shown in FIG. 14(E), possible vehicle positions are found, i.e. one or more vehicle hypotheses are generated. Particularly, the vertical edges in the image of FIG. 14(E) may be projected in the vertical direction. In this example, 9 vertical edges with a line width greater than 5 is reserved. Based on these 9 vertical edges, $C_9^2$=36 pairs of vertical position hypotheses are generated. Based on the connection region corresponding to the left and right boundaries of each pair of vertical position hypothesis in the binary edge image, the minimum rectangular box containing the connection region is judged as a vehicle hypothesis. As shown in FIG. 14(F), the white boxes represent the candidate targets (vehicle hypotheses) thus generated.

Figure 15:
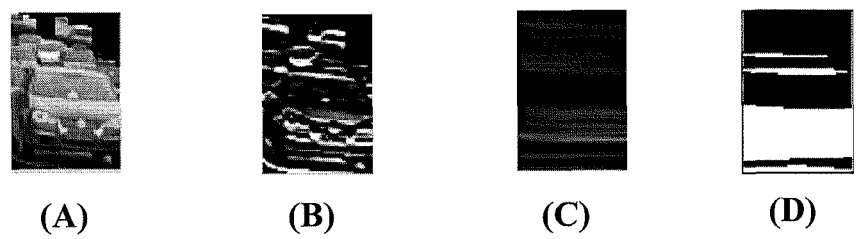
FIG. 15(A)-(D) are diagrams illustrating images processed by a target detecting method according to a particular embodiment of the disclosure.

Then in step 715, edges in the second direction in the image block which corresponds to each candidate target in the image are detected. For example, FIG. 15(A) shows a gray level image block corresponding to a rectangular box (a vehicle hypothesis) in FIG. 14(F), and FIG. 15(B) shows a horizontal gradient image block obtained by detecting the edges in the image block of FIG. 15(A) with a Sobel operator.

Optionally, the edge image including the edges in the second direction may be optimized. For example, supposing the height-width ratio of the vehicle in FIG. 15(A) is 1:1.5 and the ratio of the shadows of the front (rear) of the vehicle, the front (rear) window and the bottom of the vehicle is 1:1:1, the image block may be filtered by using a mixed Gaussian function. As an particular example, the filter as shown in the formula (2) may be used and the parameters may be set as follows:

$$k = 3, \mu_1 = 0, \mu_2 = \frac{m}{3}, \mu_3 = -\frac{m}{3};$$

$$\delta_i = \frac{n}{3}, i = 1, 2, 3$$

$$w_1 = 4, w_2 = 12, w_3 = 12$$

Where n and m represents the width and height of the vehicle, respectively.

The mixed Gaussian function is used to perform a convolution operation with the horizontal gradient image block of FIG. 15(B), to obtain the filtered image block shown in FIG. 15(C).

Optionally, binarization and close operation may be further performed to the filtered image block, to generate the region of the front (or the rear) of the vehicle. FIG. 15(D) shows the image including the region of the front (or the rear) of the vehicle obtained by performing the binarization and close operation to the image of FIG. 15(C), in which the maximum connection region containing the front of the vehicle is represented by the rectangular box.

Then in step 721, the candidate target generated in step 713 is optimized by using the regions with dense edges in the second direction (i.e. the regions containing the front of the vehicle shown in FIG. 15(D)), to obtain the optimized vehicle hypothesis.

The vehicle hypotheses thus obtained may include error detections, besides the true vehicle targets. Optionally, the candidate targets (e.g. the vehicle hypotheses) may be further validated by using a classifier (e.g. a vehicle classifier).

For example, the steps 731, 732 and 733 shown in FIG. 7 may be used to train a target classifier, so as to distinguish the targets from the non-targets. First, the training samples are collected. For example, in the case the target to be detected is vehicle, these training samples may include two types including vehicle samples and non-vehicle samples, in which the vehicle samples may be marked manually and should include as many types of vehicle shapes as possible. The non-vehicle samples are generated randomly, and the rate that they are coincident to the vehicle samples should be lower than a certain threshold. Then in step 732 the feature values of these samples are computed. For example, the feature(s) to be computed are the feature(s) that can be used to effectively recognize the target. The feature values of all the target samples and the non-target samples are calculated. As an example, Histogram of Oriented Gradients (HOG) feature may be utilized. HOG feature is a local morphological feature based on histogram of oriented gradients. As another example, Haar wavelet features or the like may be utilized. For the description related to these features, reference may be made to the following document: "*Histograms of Oriented Gradients for Human Detection*" by N. Dalai and B. Triggs (Proceedings of the IEEE international conference on computer vision and pattern recognition, vol. 1, pp. 1-8, 2005), the detailed description of which is omitted herein. Then in step 733, the above feature(s) is used as input to train the target classifier. The target classifier may be supporting vector machine, neural network classifier, or near neighbor classifier, or any other appropriate classifier, which is not numerated herein.

Optionally, the target detecting method as shown in FIG. 7 may further include a step 723 of validating the candidate targets by using a classifier. For example, if the target to be detected is vehicle, a vehicle classifier trained as described above may be used to validate to the generated vehicle hypotheses. Particularly, the feature values of the regions corresponding to the target hypotheses in the image are calculated and then input into the target classifier. Then the error detections may be removed according to the validation result output by the target classifier. Among the target hypotheses that have passed the validation of the target classifier, one or more target hypotheses that correspond to the same target may be, combined according to the similarity therebetween, to obtain the true target location.

According to some embodiments of the disclosure, there are provided some apparatus for detecting targets in an image.

FIG. 8 shows the block diagram of a target detecting apparatus according to an embodiment. Similar to the method embodiment shown in FIG. 1, the target detecting apparatus 800 shown in FIG. 8 generates target hypotheses (i.e. candidate targets) by using the edge features of the target in the input image.

As shown in FIG. 8, the target detecting apparatus 800 of the embodiment may include a first edge detecting device 801 and a candidate target generating device 802.

The first edge detecting device 801 detects the edges in a certain direction (hereinafter this direction is referred to as the first direction, and the edges along this direction is referred to as edges in the first direction), to obtain an edge image including a plurality of edges in the first direction. Similar to the above method embodiments, the first direction may be the vertical direction, or may be the horizontal direction, or may be any other direction different from the vertical and horizontal directions. A direction may be set as the first direction according to the edge features of the target to be detected in the image and the edges in this direction in the image may be detected. Similar to the above method embodiment or example, the first edge detecting device 801 may detect the edges in the first direction in the input image by using any appropriate method, the description of which is not repeated.

The candidate target generating device 802 generates one or more target hypotheses according to the plurality of edges in the first direction detected by the first edge detecting device 801, based on the assumption that there is a target between any two edges in the first direction. The region between any two of the plurality of edges in the first direction in the image corresponds to a target hypothesis (candidate target). The candidate target generating device 802 may generate the candidate targets by using the method described above with reference to step 113 of FIG. 1, the description of which is not repeated herein.

In the target detecting apparatus as shown in FIG. 8, only the edges in one direction are used to generate the candidate targets in the image, thus the computation is relatively simple, thereby speeding the target detection in the image. Moreover, since the region between any two edges in the first direction is considered as corresponding to one candidate target, failure detection may be reduced.

Figure 9:
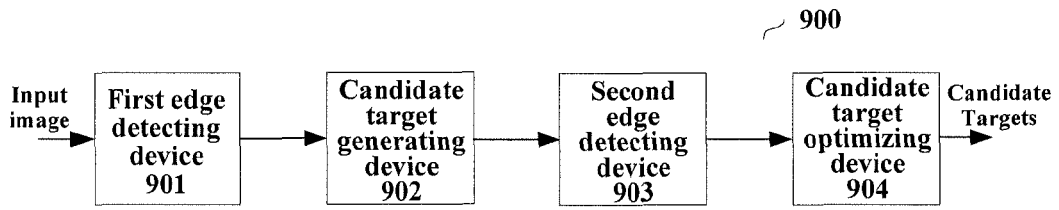
FIG. 9 is a schematic block diagram illustrating a target detecting apparatus according to another embodiment of the disclosure.

FIG. 9 illustrates a target detecting apparatus 900 according to another embodiment. Similar to the embodiment of FIG. 8, the target detecting apparatus 900 also includes a first edge detecting device (represented by "901") and a candidate target generating device (represented by "902"). The difference lies in that the target detecting apparatus 900 is further configured to optimize each candidate target by using the edges in another direction (referred to as the second direction). As shown in FIG. 9, the target detecting apparatus 900 further includes a second edge detecting device 903 and a candidate target optimizing device 904.

The first edge detecting device 901 and the candidate target generating device 902 have similar functions to the first edge detecting device 801 and the candidate target generating device 802 shown in FIG. 8, the description of which is not repeated. The second edge detecting device 903 detects the edges in the second direction in the image block corresponding to each candidate target generated by the candidate target generating device 802, to obtain an edge image block including a plurality of edges in the second direction. The second direction is a direction different from the first direction. Similar to the above method embodiments/examples, the second edge detecting device 903 may detect the edges in the second direction in the image by using any appropriate method, the description of which is not repeated.

The candidate target optimizing device 904 optimizes each candidate target according to one or more edges in the second direction corresponding to the candidate target detected by the second edge detecting device 903. For example, in the case that the vertical direction is set as the first direction and the target to be detected is vehicle and the input image is an image taken from behind the vehicles or in front of the vehicles, the front or rear parts of the vehicles in the image includes abundant structural information of horizontal (the second direction) gradient. Each target vehicle has smooth front windshield window or rear window on its upper part, and underneath each vehicle is the surface of the road. The areas between these parts each include abundant horizontal edges. According to a priori knowledge of the vehicle targets, the position information of the horizontal edges may be used to optimize the candidate targets generated based on vertical edges. For example, the heights of the candidate targets in the first direction (i.e. the vertical heights of the candidate targets) may be optimized.

Figure 10:
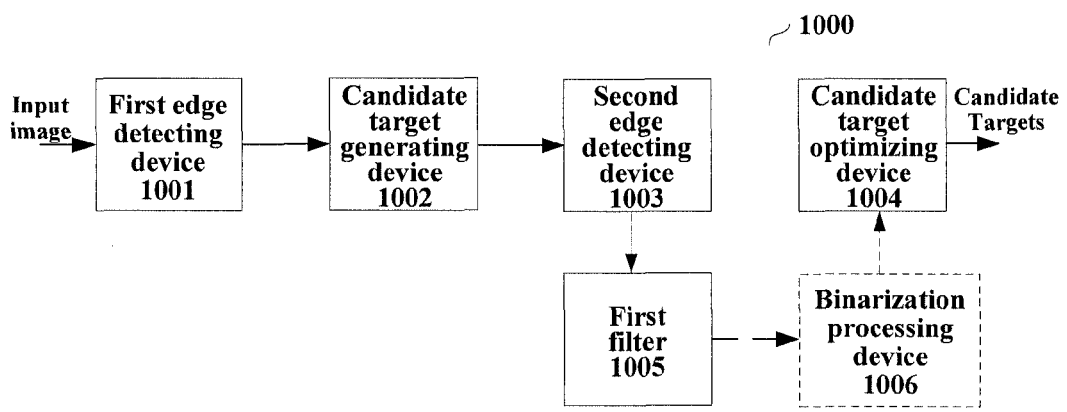
FIG. 10 is a schematic block diagram illustrating a target detecting apparatus according to another embodiment of the disclosure.

As a particular embodiment, the candidate target optimizing device 904 may employ the method described above with reference to FIG. 3 or FIG. 4 to optimize the candidate targets. FIG. 10 illustrates a target detecting apparatus 1000 according to a particular embodiment. Similar to the embodiment shown in FIG. 9, the target detecting apparatus 1000 of FIG. 10 includes a first edge detecting device, represented by 1001, a candidate target generating device, represented by 1002, a second edge detecting device, represented by 1003, and a candidate target optimizing device, represented by 1004. The difference lies in that the target detecting apparatus 1000 of FIG. 10 may further include a first filter 1005.

The first edge detecting device 1001, the candidate target generating device 1002, the second edge detecting device 1003 and the candidate target optimizing device 1004 have similar functions to the devices 901, 902, 903 and 904 as shown in FIG. 9, respectively, the description of which is not repeated.

The first filter 1005 is configured to further process the edge image block corresponding to each candidate output by the second edge detecting device 1003, to detect the region(s) with dense edges in the second direction in the edge image block. The first filter 1005 is a filter which has relatively strong response to the regions with dense edges in the second direction in the image and has relatively weak response to the other regions in the image. As an example, the first filter 1005 may be an adaptive filter designed with a mixed Gaussian function (e.g. the mixed Gaussian function as shown in Formula (2)). The parameters of the mixed Gaussian function may be set according to the above method embodiment or example, the description of which is not repeated.

The candidate target optimizing device 1004 may optimize each candidate target by using the region(s) with dense edges in the second direction detected by the first filter 1005. For example, the height in the first direction of the candidate target may be optimized.

As an example, the target detecting apparatus 1000 may further include a binarization processing device 100. After the first filter 1005 detects the region(s) with dense edges in the second direction, the binarization processing device 1006 may perform the binarization and close operation to the detected image block (for example, the binarization and close operation may be performed by using the method as shown in formulae (2) and (3), the description of which is not repeated herein). By using the binarization and close operation, the region(s) with dense edges in the second direction in the image block may be enhanced, thereby improving the result of optimizing the candidate targets performed by the candidate target optimizing device 1004.

Figure 11:
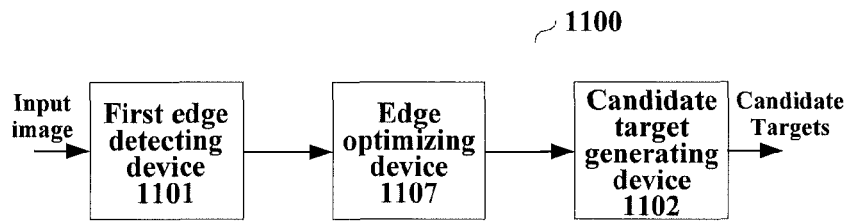
FIG. 11 is a schematic block diagram illustrating a target detecting apparatus according to another embodiment of the disclosure.

FIG. 11 shows a target detecting apparatus 1100 according to another embodiment of the disclosure. Similar to the embodiment of FIG. 8, the target detecting apparatus 1100 as shown in FIG. 11 may include a first edge detecting device (represented by 1101) and a candidate target generating device (represented by 1102). The difference lies in that the target detecting apparatus 1100 as shown in FIG. 11 may be further configured to optimizing the edges in the first direction to remove the noises, thereby improving the accuracy of the generated candidate targets. Particularly, the target detecting apparatus 1100 may further include an edge optimizing device 1107.

The first edge detecting device 1101 and the candidate target generating device 1102 have similar functions to the first edge detecting device 801 and the candidate target generating device 802 as shown in FIG. 8, respectively, the description of which is not repeated herein. The edge image output by the first edge detecting device 1101 may include much noise, such as line segments that are too short and/or too tilted, etc. The edge optimizing device 1107 may optimize the edges in the first direction in the edge image output by the first edge detecting device 1101, to remove the noise among the edges.

Figure 12:
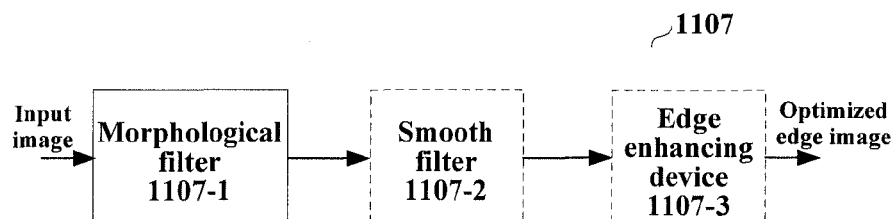
FIG. 12 is a schematic block diagram illustrating a target detecting apparatus according to another embodiment of the disclosure.

FIG. 12 shows an example of the structure of the edge optimizing device 1107. As shown in FIG. 12, the edge optimizing device 1005 may include a morphological filter 1107-1. The morphological filter 1107-1 is configured to perform a morphological filtering to the edge image output by the first edge detecting device 1101. As a particular example, the morphological filter 1107-1 may perform the morphological filtering by using the filtering method described above with reference to the method embodiment/examples, for example, the method of formula (5), the description of which is not repeated herein. By using the morphological filter 1107-1, the small-sized noises may be removed from the edge image. For example, in the case that the vertical direction is set as the first direction and the horizontal direction is set as the second direction, the vertical edges (exhibited as vertical line segments) at the same horizontal coordinate may be connected with each other to obtain vertical edges with a relatively long length, while the small-sized noises are removed.

As an example, the edge optimizing device 1005 may further include a smooth filter 1107-2 configured to perform a smooth filtering to the morphologically filtered edge image. The smooth filter 1107-2 may utilize any appropriate smooth filtering method, e.g. the smooth filter 1107-2 may be a median filter or the like. Utilization of the smooth filter 1107-2 facilitates to find the boundaries in the first direction of the candidate targets in the edge image, i.e. to find the positions with dense edges in the first direction or positions of edges in the first direction with high brightness, thus improving the accuracy of the generated candidate targets.

As another example, the edge optimizing device 1005 may further include an edge enhancing device 1107-3 configured to enhance the edges in the edge image which has been subject to the morphological filtering and/or smooth filtering. The edge enhancing device 1107-3 may utilize any appropriate edge enhancing method, such as binarization operation, or the like.

The candidate target generating device 1102 is configured to generate candidate target(s) based on the edges in the first direction in the edge image processed by the edge optimizing device 1107, the description of which is not repeated. With the optimization of the edges in the first direction, the error detection in the candidate targets to be generated by the candidate target generating device 1102 may be reduced.

Figure 13:
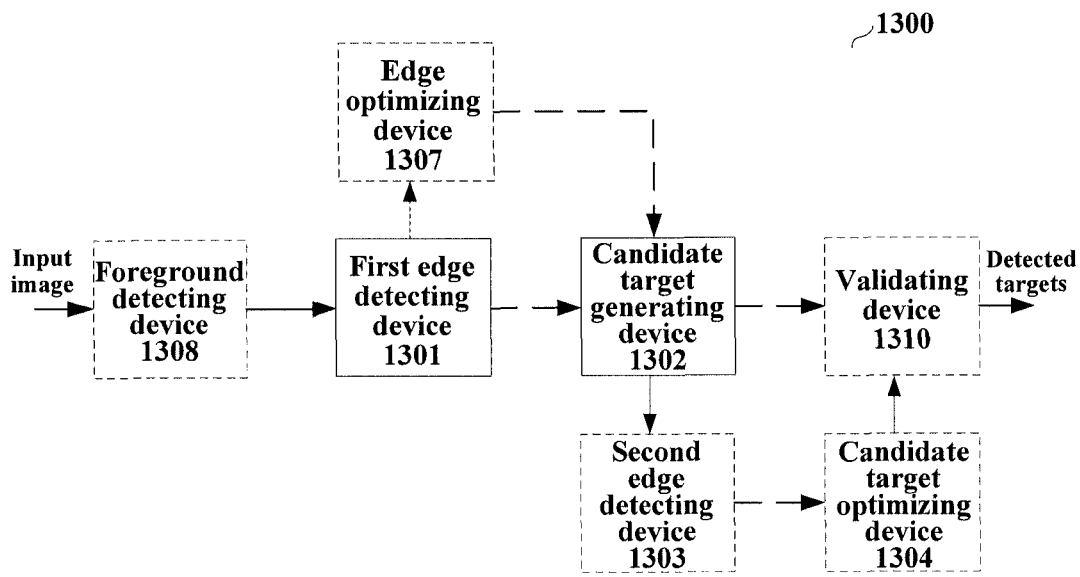
FIG. 13 is a schematic block diagram illustrating a target detecting apparatus according to another embodiment of the disclosure.

FIG. 13 illustrates a target detecting apparatus 1300 according to a particular embodiment of the disclosure.

As shown in FIG. 13, the target detecting apparatus 1300 may include a first edge detecting device 1301 and a candidate target generating device 1302. The first edge detecting device 1301 and the candidate target generating device 1302 have similar functions to the device 801/901/1001/1101 and the device 802/902/1002/1102 in the above embodiments, respectively, the description of which is not repeated. The target detecting apparatus 1300 may further include a second edge detecting device 1303 and a candidate target optimizing device 1304. The second edge detecting device 1303 and the candidate target optimizing device 1304 have similar functions to the device 903/1003 and the device 904/1004, respectively, the description of which is not repeated, either. The target detecting apparatus 1300 may further include an edge optimizing device 1307 which is similar to the device 1107 shown in FIG. 11 or 12, the description of which is also omitted.

As an example, the target detecting apparatus 1300 may further include a foreground detecting device 1308. The foreground detecting device 1308 is configured to detect the foreground of the input image, to obtain one or more target connection regions. The first edge detecting device 1301 may be configured to detect the edges in the areas in the input image which correspond to the target connection regions detected by the foreground detecting device 1308, the description of which is not repeated herein.

Optionally, the target detecting apparatus 1300 may further include a validating device 1310 configured to validate the generated candidate targets, to remove the error detections. The validating device 1310 may be a target classifier. For example, the target classifier may be trained by using the steps 731, 732 and 733 shown in FIG. 7, the description of which is not repeated herein. The validating device 1310 may calculate the feature value(s) of the image region corresponding to each candidate target and validate each candidate target by using the feature value(s), to remove the error detections in the candidate targets. Among the candidate targets that have passed the validation, the validating device 1310 may further combine one or more candidate targets that correspond to the same target according to the similarity therebetween, to obtain the true target locations.

It should be understood that the above embodiments and examples are illustrative, rather than exhaustive. The present disclosure should not be regarded as being limited to any particular embodiments or examples stated above.

In the above embodiments and/or examples, some expressions (e.g. "the first direction" and "the second direction") contain the wording "first" or "second". It should be understood that such expressions are merely used to literally distinguish the terms from each other and should not be considered as a limitation to their order or any other limitation.

The target detecting method or apparatus according to the embodiments or examples of the disclosure may be applied to various application scenarios. For example, the target detecting method or apparatus may be applied in traffic monitoring to detect the vehicles in the traffic video. Provided with a traffic video, the target detecting method or apparatus according to the embodiments or examples of the disclosure may automatically detect the vehicles on the road shown in the video and output the position parameters of the detected vehicles in the images. In addition, the target detecting method or apparatus according to the embodiments or examples of the disclosure may be configured in other electronic device for video monitoring, such as park monitoring device, etc; or may be applied to electronic devices having image processing functions, such as computers, electronic devices with camera or video camera, or the like. The target that can be detected by the above target detecting method and apparatus is not limited to vehicle.

In the embodiments or examples of the disclosure, the input image may be a picture or video of any format, such as AVI (Audio Video Interleave) or MPEG (Moving Picture Experts Group), etc. In the case of road traffic monitoring, the input image (or video) may be took by using the camera device installed on either side of the road or installed above the road (e.g. the camera device may be installed on a T shaped stand on the either side of the road, or fixed on the support installed above the road). The video of the front parts or rear parts of the vehicles may be taken from either side of the road, or the video of the platforms of the vehicles may be taken from above the road, and in these cases the front or rear of the vehicles or the platforms of the vehicles are targets to be detected. By adjusting the depression angle, the left and right deflection angles and the lenses of the camera, the detection area of the video may be limited to one or two lanes on the road. The aperture and shutter of the camera may also be adjusted so that the image frames thus taken have appropriate contrast ratio and brightness, thereby improving the effect of the target detection.

The video or pictures often contains other information besides the targets. For example, the traffic video may include the color channel number for recording the video image, the frame rate for measuring the number of frames displayed per second, and/or the resolution representing the number of pixels in the image, etc. The target detecting method or apparatus according to the embodiments and/or examples of the disclosure does not depend upon these information, and thus is of general utility.

The components, units or steps in the above apparatuses and methods can be configured with software, hardware, firmware or any combination thereof, by using method or means well known in the art, the details of which are omitted herein.

Figure 16:
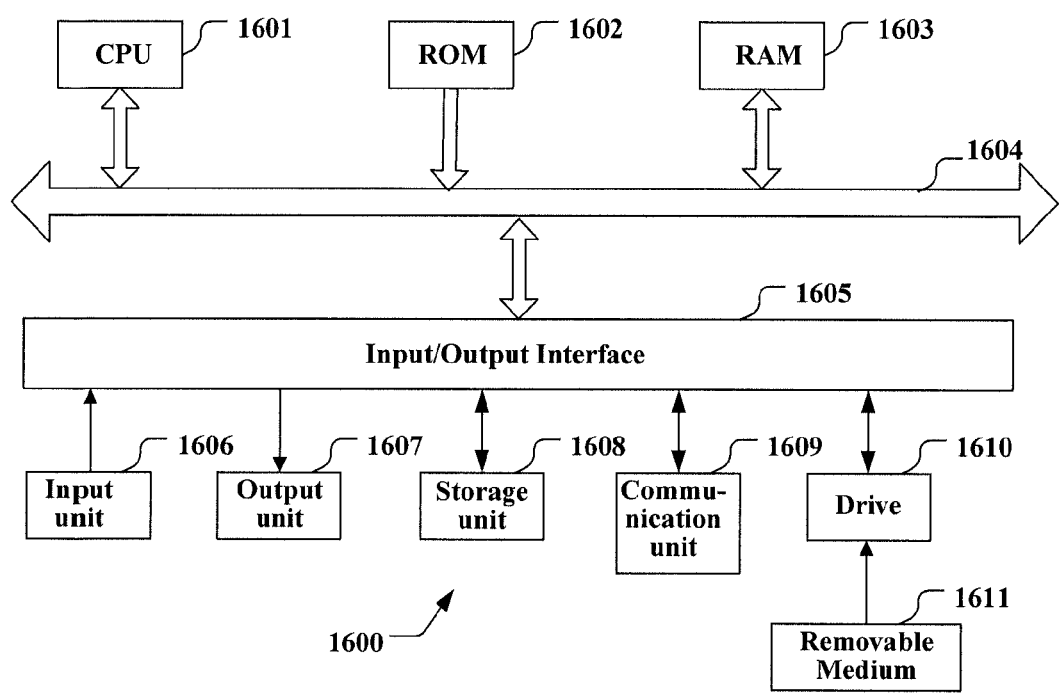
FIG. 16 is a schematic block diagram illustrating the structure of a computer for realizing the methods according to embodiments or examples of the disclosure.

As an example, in the case of using software or firmware, programs constituting the software for realizing the above method or apparatus can be installed to a computer with a specialized hardware structure (e.g. the general purposed computer as shown in FIG. 16) from a storage medium or a network. The computer, when installed with various programs, is capable of carrying out various functions.

In FIG. 16, a central processing unit (CPU) 1601 executes various types of processing in accordance with programs stored in a read-only memory (ROM) 1602, or programs loaded from a storage unit 1608 into a random access memory (RAM) 1603. The RAM 1603 also stores the data required for the CPU 1601 to execute various types of processing, as required. The CPU 1601, the ROM 1602, and the RAM 1603 are connected to one another through a bus 1604. The bus 1604 also connects to an input/output interface 1605.

The input/output interface 1605 connects to an input unit 1606 composed of a keyboard, a mouse, etc., an output unit 1607 composed of a cathode ray tube or a liquid crystal display, a speaker, etc., the storage unit 1608, which includes a hard disk, and a communication unit 1609 composed of a modem, a terminal adapter, etc. The communication unit 1609 performs communicating processing. A drive 1610 is connected to the input/output interface 1605, if needed. In the drive 1610, for example, removable media 1611 is loaded as a recording medium containing a program of the present invention. The program is read from the removable media 1611 and is installed into the storage unit 1608, as required.

In the case of using software to realize the above consecutive processing, the programs constituting the software may be installed from a network such as Internet or a storage medium such as the removable media 1611.

Those skilled in the art should understand the storage medium is not limited to the removable media 1611, such as, a magnetic disk (including flexible disc), an optical disc (including compact-disc ROM (CD-ROM) and digital versatile disk (DVD)), an magneto-optical disc (including an MD (Mini-Disc) (registered trademark)), or a semiconductor memory, in which the program is recorded and which are distributed to deliver the program to the user aside from a main body of a device, or the ROM 1602 or the hard disc involved in the storage unit 1608, where the program is recorded and which are previously mounted on the main body of the device and delivered to the user.

The present disclosure further provides a program product having machine-readable instruction codes which, when being executed, may carry out the method for cross phase modulation recovery according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

As can be seen from the above description, the embodiments of the present disclosure provide at least the following solutions:

Note 1. A target detecting method, comprising:
detecting edges in a first direction in an input image, to obtain an edge image comprising a plurality of edges in the first direction; and
generating one or more candidate targets according to the plurality of edges in the first direction, a region between any two of the plurality of edges in the first direction in the input image corresponding to one of the candidate targets.

Note 2. The method according to note 1, further comprising:
detecting edges in a second direction different from the first direction in an image block corresponding to each candidate target in the input image, to obtain an edge image block comprising one or more edges in the second direction; and
optimizing the each candidate target according to the one or more edges in the second direction.

Note 3. The method according to note 2, further comprising:
detecting a region, having a high density of edges in the second direction, in the edge image block, and wherein optimizing the each candidate target comprising: optimizing the each candidate target according to the region having a high density of edges in the second direction.

Note 4. The method according to note 3, wherein detecting the region having a high density of edges in the second direction comprising:

filtering the edge image block by using a mixed Gaussian function and performing a binarization and close operation to the filtered edge image block.

Note 5. The method according to any one of notes 1-4, further comprising:

optimizing the plurality of edges in the first direction in the edge image.

Note 6. The method according to note 5, wherein optimizing the plurality of edges in the first direction in the edge image comprises:

performing a morphological filtering to the edge image.

Note 7. The method according to note 6, wherein performing the morphological filtering to the edge image comprises:

performing close and open operations to the edge image by using a structure element in the first direction, the size of the structure element being determined according to a size of a target to be detected.

Note 8. The method according to note 6, wherein optimizing the plurality of edges in the first direction further comprises:

performing a smooth filtering to the morphologically filtered edge image.

Note 9. The method according to note 6, wherein optimizing the plurality of edges in the first direction further comprises:

performing an edge enhancement to the morphologically filtered edge image.

Note 10. The method according to any one of notes 1-4, further comprising:

detecting a foreground in the input image, to obtain one or more target connection regions, and wherein detecting edges in the first direction in the input image comprises: detecting edges in the first direction in regions, corresponding to the one or more target connection regions, in the input image.

Note 11. The method according to any one of notes 1-4, wherein the first direction is one of a vertical direction and a horizontal direction.

Note 12. The method according to any one of notes 2-4, wherein the second direction is one, which is different from the first direction, of a vertical direction and a horizontal direction.

Note 13. A target detecting apparatus, comprising:

a first edge detecting device, configured to detect edges in a first direction in an input image, to obtain an edge image comprising a plurality of edges in the first direction; and a candidate target generating device, configured to generate one or more candidate targets according to the plurality of edges in the first direction detected by the first edge detecting device, a region between any two of the plurality of edges in the first direction in the input image corresponding to one of the candidate targets.

Note 14. The apparatus according to note 13, further comprising:

a second edge detecting device, configured to detect edges in a second direction different from the first direction in an image block corresponding to each candidate target in the input image, to obtain an edge image block comprising one or more edges in the second direction; and a candidate target optimizing device, configured to optimize each candidate target generated by the candidate target generating device according to the one or more edges in the second direction.

Note 15. The apparatus according to note 14, further comprising:

a first filter, configured to detect a region, having a high density of edges in the second direction, in the edge image block from the second edge detecting device, and wherein the candidate target optimizing device is further configured to: optimize the each candidate target according to the region having a high density of edges in the second direction.

Note 16. The apparatus according to note 15, wherein the first filter is a Gaussian filter configured to filter the edge image block by using a mixed Gaussian function, and the target detecting apparatus further comprises:

a binarization processing device, configured to perform a binarization and close operation to the filtered edge image block.

Note 17. The apparatus according to any one of notes 13-16, further comprising:

an edge optimizing device, configured to optimize the plurality of edges in the first direction in the edge image from the first edge detecting device.

Note 18. The apparatus according to note 17, wherein the edge optimizing device comprises:

a morphological filter, configured to perform a morphological filtering to the edge image from the first edge detecting device.

Note 19. The apparatus according to note 18, wherein the morphological filter is further configured to: perform close and open operations to the edge image by using a structure element in the first direction, and wherein the size of the structure element is determined according to a size of a target to be detected.

Note 20. The apparatus according to note 18, wherein the edge optimizing device further comprises:

a smooth filter, configured to perform a smooth filtering to the edge image filtered by the morphological filter.

Note 21. The apparatus according to note 18, wherein the edge optimizing device further comprises:

an edge enhancing device, configured to perform an edge enhancement to the edge image filtered by the morphological filter.

Note 22. The apparatus according to any one of notes 13-16, further comprising:

a foreground detecting device, configured to detect a foreground in the input image, to obtain one or more target connection regions, and output the one or more target connection regions to the first edge detecting device.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. A target detecting method, comprising:

detecting edges in a first direction in an input image, to obtain an edge image comprising a plurality of edges in the first direction; and generating one or more candidate targets according to the plurality of edges in the first direction, a region between any two of the plurality of edges in the first direction in the input image corresponding to one of the candidate targets;

detecting edges in a second direction different from the first direction in an image block corresponding to each candidate target in the input image, to obtain an edge image block comprising one or more edges in the second direction;

optimizing the each candidate target according to the one or more edges in the second direction;

detecting a region, having a high density of edges in the second direction, in the edge image block, and wherein optimizing the each candidate target comprising: optimizing the each candidate target according to the region having a high density of edges in the second direction.

2. The method according to claim 1, wherein detecting the region having a high density of edges in the second direction comprising:

filtering the edge image block by using a mixed Gaussian function and performing a binarization and close operation to the filtered edge image block.

3. The method according to claim 1, further comprising: optimizing the plurality of edges in the first direction in the edge image.

4. The method according to claim 3, wherein optimizing the plurality of edges in the first direction in the edge image comprises:

performing a morphological filtering to the edge image.

5. The method according to claim 4, wherein performing the morphological filtering to the edge image comprises:

performing close and open operations to the edge image by using a structure element in the first direction, the size of the structure element being determined according to a size of a target to be detected.

6. The method according to claim 4, wherein optimizing the plurality of edges in the first direction further comprises:

performing a smooth filtering to the morphologically filtered edge image.

7. The method according to claim 4, wherein optimizing the plurality of edges in the first direction further comprises:

performing an edge enhancement to the morphologically filtered edge image.

8. The method according to claim 1, further comprising: detecting a foreground in the input image, to obtain one or more target connection regions, and wherein detecting edges in the first direction in the input image comprises: detecting edges in the first direction in regions, corresponding to the one or more target connection regions, in the input image.

9. A target detecting apparatus, comprising:

a first edge detecting device, configured to detect edges in a first direction in an input image, to obtain an edge image comprising a plurality of edges in the first direction; and a candidate target generating device, configured to generate one or more candidate targets according to the plurality of edges in the first direction detected by the first edge detecting device, a region between any two of the plurality of edges in the first direction in the input image corresponding to one of the candidate targets;

a second edge detecting device, configured to detect edges in a second direction different from the first direction in an image block corresponding to each candidate target in the input image, to obtain an edge image block comprising one or more edges in the second direction; and a candidate target optimizing device, configured to optimize each candidate target generated by the candidate target generating device according to the one or more edges in the second direction;

a first filter, configured to detect a region, having a high density of edges in the second direction, in the edge image block from the second edge detecting device, and wherein the candidate target optimizing device is further configured to: optimize the each candidate target according to the region having a high density of edges in the second direction.

10. The apparatus according to claim 9, wherein the first filter is a Gaussian filter configured to filter the edge image block by using a mixed Gaussian function, and the target detecting apparatus further comprises:

a binarization processing device, configured to perform a binarization and close operation to the filtered edge image block.

11. The apparatus according to claim 9, further comprising:

an edge optimizing device, configured to optimize the plurality of edges in the first direction in the edge image from the first edge detecting device.

12. The apparatus according to claim 11, wherein the edge optimizing device comprises:

a morphological filter, configured to perform a morphological filtering to the edge image from the first edge detecting device.

13. The apparatus according to claim 12, wherein the morphological filter is further configured to: perform close and open operations to the edge image by using a structure element in the first direction, and wherein the size of the structure element is determined according to a size of a target to be detected.

14. The apparatus according to claim 12, wherein the edge optimizing device further comprises:

a smooth filter, configured to perform a smooth filtering to the edge image filtered by the morphological filter.

15. The apparatus according to claim 12, wherein the edge optimizing device further comprises:

an edge enhancing device, configured to perform an edge enhancement to the edge image filtered by the morphological filter.

16. The apparatus according to claim 9, further comprising:

a foreground detecting device, configured to detect a foreground in the input image, to obtain one or more target connection regions, and output the one or more target connection regions to the first edge detecting device.

* * * * *